D. HOROVICZ & J. & A. KACZANDER.
ANIMAL TRAP.
APPLICATION FILED JUNE 29, 1914.

1,183,878.

Patented May 23, 1916.

WITNESSES:
Adalbert Alexay
Sigmund Kornitz

INVENTOR
DAVID HOROVICZ
JOSEPH KACZANDER
ARMIN KACZANDER
BY
O. S. Leszay
ATTORNEY

UNITED STATES PATENT OFFICE.

DAVID HOROVICZ AND JOSEPH KACZANDER, OF NEW YORK, N. Y., AND ARMIN KACZANDER, OF HAMTRAMCK, MICHIGAN.

ANIMAL-TRAP.

1,183,878.  Specification of Letters Patent.  Patented May 23, 1916.

Application filed June 29, 1914. Serial No. 848,074.

*To all whom it may concern:*

Be it known that we, DAVID HOROVICZ and JOSEPH KACZANDER, subjects of the King of Hungary, residing at 515 East Seventy-eighth street, in the county and State of New York, and ARMIN KACZANDER, a subject of the King of Hungary, residing at Hamtramck, in the county of Wayne, State of Michigan, have invented certain new and useful Improvements in Animal-Traps of which the following is a specification.

This invention relates to an improved rat trap having a permanent opening in one wall thereof through which the rat enters into the trap and due to the construction of the entrance is prevented from leaving the trap.

The principal object is the provision of a transparent trap having mirrors secured to adjacent rear walls thereof and a bait retainer adjacent the reflecting surfaces, adapted to be seen from distant points.

Further objects reside in arrangement of entrance and exits to the glass trap and in the construction of a cheap, durable, sanitary and effective trap.

With these and other objects in view, the invention consists of the improvements hereinafter described and finally claimed.

Figure 1:
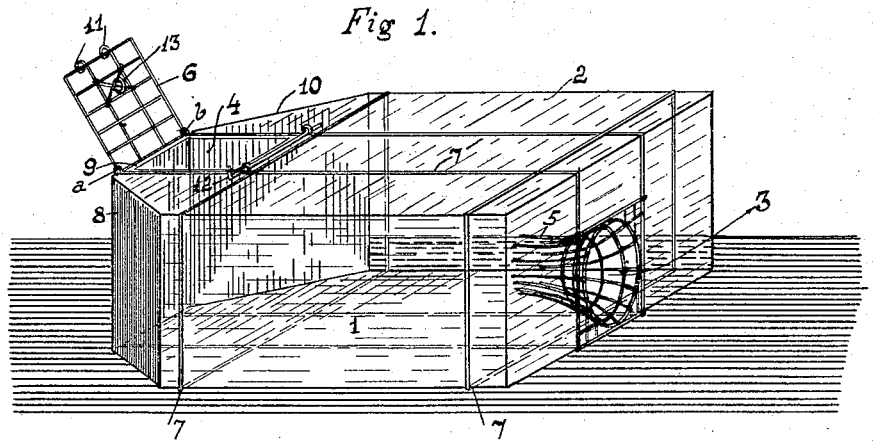
Figure 2:
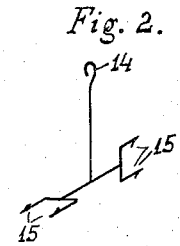

The nature, characteristic features and scope of the invention will be more fully understood from the following description taken in connection with the accompanying drawings forming part hereof and in which:

Figure 1 is a perspective view of our invention. Fig. 2 is a plan view of the bait hook.

Referring to the drawings, we have there shown a trap of our improved construction, and which we have designated by the numeral 1, having its surfaces 2 formed of glass. An opening 3 is provided in the front of the trap 1 in which the entrance 5 is positioned, the construction of which will hereafter more fully appear. In the top of the trap adjacent the rear thereof, an opening 4 is provided serving to receive a cover 6, the construction of which and manner of attachment to the trap 1 will hereafter more fully be described.

The trap 1 adjacent the opening has its sides 2 formed in the shape of a bay and has the inner surface of its complemental rear walls 8, 9 and 10 provided with reflecting surfaces, preferably mirrors. Transverse parallel metal bands 7—7, entirely encircling the trap 1 serve to retain the cover 6 hinged to the bands as at a—b. And provided at its other side with receivers 11 adapted to be engaged by a retainer 12 secured to the band 7 adjacent the opposite side of the opening 4 to lock the cover 6 in place. A ring 13 is secured adjacent the center of the cover 6 and serves to receive the hook 14 of a bait container, provided with transverse bait retainers 15—15. We have shown two bait retainers 15 but may provide three, four or as many retainers as desired. The entrance 5 is constructed of transversely disposed metal bands secured to the bands 7 and which are bent substantially at right angles to the front wall of the trap so as to provide an outwardly flaring entrance, and having its inner end provided with sharpened bands so as to prevent the rat from climbing back into the flaring entrance and escape from the trap.

The operation of the trap is as follows: The bait is fastened to the bait retainer 15 and the top 6 is locked in place by means of the retainer 12. The trap is then placed in the desired location. The rat approaches and sees the bait, due to the fact, that the trap is constructed of glass. The mirror reflects the bait and the rat not only sees a second or third bait but a representation of itself and being under the impression that another rat is in the trap, tries to enter the trap. The entrance due to its flaring mouth allows the rat to enter the trap, but when the rat tries to escape from the trap the rat is impinged upon the sharpened bands of the rear of the entrance and receives a mortal wound. During the inspection of the trap, should the rat be dead, it can easily be removed from the same through the opening 4, after the top 6 has been swung back on its hinge. If the rat is still alive the entire trap may be submerged in water, as the trap, due to its construction, cannot be damaged by the elements, particularly since the metal bands are galvanized.

Having now described our invention and the manner in which the same is operated, we do not limit ourselves to the exact description and drawing disclosed, as we reserve the right to deviate from the same without departing from the spirit of the in- vention and the scope of the appended claim.

We claim:

In an animal trap of the character described, the combination of a transparent casing, provided with an entrance opening for the animal in one of its end walls, a bay-window structure forming the opposite end wall, three mirrors secured to said last named end wall, metal bands for holding the parts of the trap together, a cover hinged to this end wall between two of said metal bands, a ring secured to the under side of said cover, means for locking said cover in its closed position, a hook suspended from said ring in front of said mirrors, a plurality of transversely disposed bait retainers secured to said hook, transversely disposed metal bands secured between two of said metal strips at the front wall of the trap providing an outwardly flaring entrance opening for the animal, and having their rear ends sharpened to prevent escape of the trapped animal.

In testimony whereof we affix our signature in the presence of two witnesses.

DAVID HOROVICZ.
JOSEPH KACZANDER.

Witnesses:
ANTON STEINBERGER,
BEATRICE BROWN.

ARMIN KACZANDER.

Witnesses:
WOLF KAPLAN,
JOS. A. BLANK.

Copies of this patent may be obtained for five cents each, by addressing the "Commissioner of Patents, Washington, D. C."